(12) United States Patent
Liao

(10) Patent No.: US 10,040,405 B2
(45) Date of Patent: Aug. 7, 2018

(54) MOBILE PHONE CAR MOUNT

(71) Applicant: YONGDELI SILICONE RUBBER TECHNOLOGY (SHENZHEN) CO., LTD, Shenzhen, Guangdong (CN)

(72) Inventor: Denan Liao, Guangdong (CN)

(73) Assignee: YONGDELI SILICONE RUBBER TECHNOLOGY (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 15/328,066

(22) PCT Filed: Sep. 23, 2016

(86) PCT No.: PCT/CN2016/099792
§ 371 (c)(1),
(2) Date: Jan. 23, 2017

(87) PCT Pub. No.: WO2017/166736
PCT Pub. Date: Oct. 5, 2017

(65) Prior Publication Data
US 2017/0349116 A1    Dec. 7, 2017

(30) Foreign Application Priority Data

Mar. 28, 2016    (CN) .......................... 2016 1 0182107

(51) Int. Cl.
*B60R 11/00* (2006.01)
*B60R 11/02* (2006.01)
(Continued)

(52) U.S. Cl.
CPC .......... *B60R 11/0241* (2013.01); *A45C 11/00* (2013.01); *F16B 7/14* (2013.01);
(Continued)

(58) Field of Classification Search
CPC ....... B60R 11/00; B60R 11/02; B60R 11/024; B60R 2011/007; B60R 2011/0078; B60R 2011/0089; F16C 11/06; F16M 13/04
(Continued)

(56) References Cited

U.S. PATENT DOCUMENTS 5,187,744 A * 2/1993 Richter ............... B60R 11/0241
224/553
6,135,408 A * 10/2000 Richter ................... B60R 11/00
224/183

(Continued)

*Primary Examiner* — Brian D Nash

(57) ABSTRACT

The present invention, pertaining to the field of smart device accessories, provides a mobile phone car mount. The mobile phone car mount comprises: a mobile phone shell, a securing portion, a rotating portion and a holding portion; wherein a back of the mobile phone shell comprises a metal portion; a front end of the securing portion is provided with a magnet, the magnet being in magnetic-snap to the metal portion; a rear end of the securing portion is secured to a rotation side of the rotating portion; a back of a securing side of the rotating portion is coupled to a rear end of the holding portion, a top portion of the securing side is provided with a press switch; and the press switching driving the holding portion to open or close. The technical solution according to the present invention has the advantage of bettering user experience.

4 Claims, 2 Drawing Sheets

(51) Int. Cl.
*H04B 1/3877* (2015.01)
*F16C 11/06* (2006.01)
*F16M 13/04* (2006.01)
*A45C 11/00* (2006.01)
*F16B 7/14* (2006.01)

(52) U.S. Cl.
CPC ............. *F16C 11/06* (2013.01); *F16M 13/04* (2013.01); *H04B 1/3877* (2013.01); *A45C 2011/002* (2013.01); *B60R 2011/007* (2013.01); *B60R 2011/0078* (2013.01); *B60R 2011/0089* (2013.01)

(58) Field of Classification Search
USPC ........................................................ 224/585
See application file for complete search history.

(56) References Cited

U.S. PATENT DOCUMENTS

| | | | | |
|---|---|---|---|---|
| 6,149,116 A * | 11/2000 | Won | .................... | B60R 11/0241 224/553 |
| 6,739,567 B1 * | 5/2004 | Curtis | .................... | E01F 9/681 248/519 |
| 7,374,142 B2 * | 5/2008 | Carnevali | .............. | F16M 13/00 224/183 |
| 8,398,155 B2 * | 3/2013 | Andochick | ............. | B60R 11/00 224/483 |
| 8,708,151 B2 * | 4/2014 | Whitten | ................. | G06F 1/1656 206/701 |
| 8,749,363 B2 * | 6/2014 | Masuda | ................. | B60K 35/00 224/400 |
| 8,757,461 B2 * | 6/2014 | Zanetti | .................... | B60R 11/02 224/483 |
| 8,827,127 B2 * | 9/2014 | Rekuc | .................... | A45C 15/00 224/183 |
| 8,857,687 B1 * | 10/2014 | An | ......................... | B60R 11/02 224/282 |
| 8,936,222 B1 * | 1/2015 | Bastian | ..................... | A45F 5/00 224/183 |
| 8,950,727 B2 * | 2/2015 | Skudelny | .............. | B63C 11/205 128/201.27 |
| 8,960,623 B2 * | 2/2015 | Woolford | ............... | F16M 13/00 224/545 |
| 9,448,588 B2 * | 9/2016 | Barnard | ................ | G06F 1/1626 |
| 9,473,608 B1 * | 10/2016 | Sherman | .................. | H04M 1/21 |
| 2004/0232291 A1 * | 11/2004 | Carnevali | .............. | F16M 13/00 248/206.5 |
| 2006/0118585 A1 * | 6/2006 | Ognissanti | ............... | B62J 9/008 224/413 |
| 2008/0023508 A1 * | 1/2008 | Harchol | .................... | A45F 5/02 224/183 |
| 2010/0081377 A1 * | 4/2010 | Chatterjee | ............. | G06F 1/1632 455/41.1 |
| 2010/0327031 A1 * | 12/2010 | Olmos | ...................... | A45F 5/02 224/269 |
| 2011/0024470 A1 * | 2/2011 | Hajarian | ............. | B60R 11/0241 224/276 |
| 2011/0192857 A1 * | 8/2011 | Rothbaum | ................ | B25F 1/00 220/694 |
| 2012/0080462 A1 * | 4/2012 | Hajarian | ................... | A45F 5/00 224/219 |
| 2012/0292466 A1 * | 11/2012 | Song | ..................... | F16B 47/003 248/205.4 |
| 2014/0034697 A1 * | 2/2014 | Mak | ....................... | B60N 3/103 224/483 |
| 2014/0312086 A1 * | 10/2014 | Whitten | ................ | G06F 1/1656 224/420 |
| 2015/0102073 A1 * | 4/2015 | Pusateri | ............... | H04B 1/3888 224/191 |
| 2015/0189962 A1 * | 7/2015 | Yeo | ........................ | A45C 11/00 361/679.17 |
| 2015/0201740 A1 * | 7/2015 | Richardson | ............... | A45F 5/00 224/255 |
| 2015/0305461 A1 * | 10/2015 | Su | ......................... | G06F 1/1628 224/191 |
| 2016/0058145 A1 * | 3/2016 | Whitten | ................. | A45C 11/00 224/191 |
| 2016/0082893 A1 * | 3/2016 | Ormsbee | ............. | B60R 11/0241 224/558 |
| 2016/0106202 A1 * | 4/2016 | Ford | ................... | A45C 13/1069 224/267 |
| 2016/0165025 A1 * | 6/2016 | Sheu | ........................ | H04M 1/04 455/557 |

\* cited by examiner

MOBILE PHONE CAR MOUNT

TECHNICAL FIELD

The present invention relates to the field of smart device accessories, and in particular, relates to a mobile phone car mount.

BACKGROUND

A mobile phone car mount is a simple and use-friendly digital mount which is comfortable in use, focuses user experience, has excellent structural design and complies with ergonomic design. The man-machine design concept allows a user who is driving to have a better user experience.

A conventional mobile phone car mount is inconvenient for the user to user, and the user fails to freely adjust the angle thereof. Therefore, user experience is poor.

SUMMARY

Embodiments of the present invention are intended to provide a mobile phone car mount, to solve the technical problem that, in the related art, the angle may not be randomly adjusted, and user experience is poor.

In one aspect, disclosed is a mobile phone car mount. The mobile phone car mount comprises: a mobile phone shell, a securing portion, a rotating portion and a holding portion; wherein a back of the mobile phone shell comprises a metal portion; a front end of the securing portion is provided with a magnet, the magnet being in magnetic-snap to the metal portion; a rear end of the securing portion is secured to a rotating side of the rotating portion; a back of a securing side of the rotating portion is coupled to a rear end of the holding portion, a top portion of the securing side is provided with a press switch; and the press switch driving the holding portion to open or close.

Optionally, the back of the mobile phone shell is provided with a plurality of holes.

Optionally, the rotating side is a round ball, and the securing side of the rotating portion is provided with a round ball groove mating with the round ball, a maximum depth of the round ball groove being greater than a radius of the round ball and less than a diameter of the round ball.

Optionally, an outer surface of the round ball is provided with a telescopic plate that is capable of telescoping radially along the round ball, the telescopic plate being of a triangular shape.

Optionally, the mobile phone car mount further comprises a selfie stick; wherein the selfie stick comprises a telescopic rod and a joint portion, the joint portion being provided with a notch mating with the press switch.

According to the embodiments of the present invention, the rotating mechanism of the mobile phone in the technical solution according to the present invention allows a user to randomly adjust the angle, and thus a better user experience is achieved.

DETAILED DESCRIPTION

Figure 1:
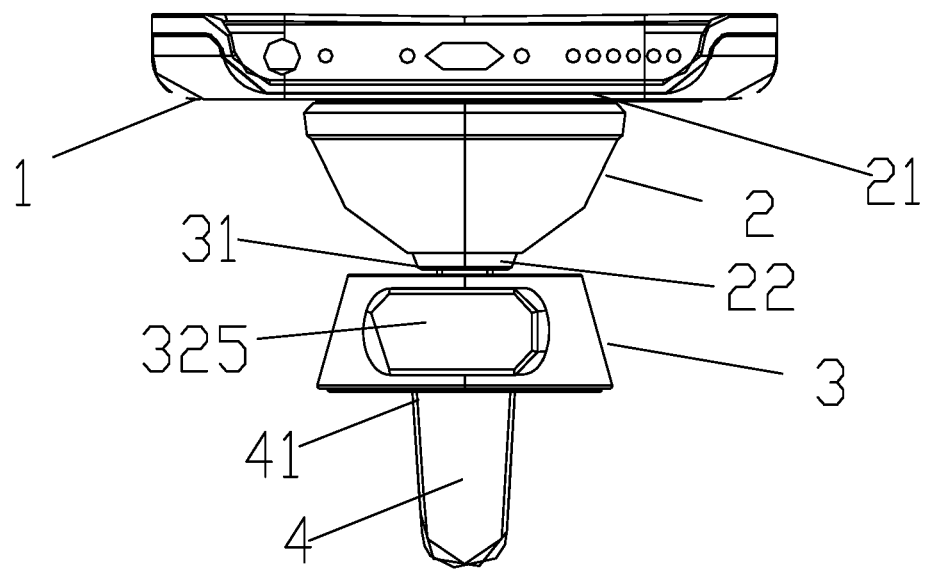
FIG. 1 is a front view of a mobile phone car mount according to an embodiment of the present invention.

The technical solutions contained in the embodiments of the present invention are described in detail clearly and completely hereinafter with reference to the accompanying drawings for the embodiments of the present invention. Apparently, the described embodiments are only a portion of embodiments of the present invention, but not all the embodiments of the present invention. Based on the embodiments of the present invention, all other embodiments derived by persons of ordinary skill in the art without any creative efforts shall fall within the protection scope of the present invention.

In addition, the following embodiments are described with reference to the attached drawings for illustrating that the present invention may be applied to practice specific embodiments. Furthermore, the directional terms described in the present invention, such as "upper", "lower", "front", "rear", "left", "right", "inner", "outer", "side" and the like, are only directions with reference to the attached drawings. Therefore, the used directional terms are used for better and clearer illustration and understanding of the present invention, instead of indicating or implying that the device or element shall have a particular orientation and shall be structured and operated based on the particular orientation. Accordingly, these terms shall not be construed as limiting the present invention.

In the description of the present invention, it should be noted that unless otherwise specified and defined, the terms "mounted", "coupled" and "connected" and derivative forms of these words shall be understood in a broad sense, which, for example, may be understood as fixed connection, detachable connection or integral connection; may be directly connected, indirectly connected via an intermediate medium or communication between the interiors of two elements. Persons of ordinary skill in the art may understand the specific meanings of the above terms in the present invention according to the actual circumstances and contexts.

In addition, during the description of the present invention, the term "multiple", "more" or "a plurality of" refers to at least two unless otherwise specified. If the term "working procedure" is used in the description, the term does not merely signify an independent working procedure, and also include any procedure or process that is capable of achieving the anticipated effect of this working procedure in case of failure to distinguishing this specific working procedure from the other working procedures. In addition, the "en dash" used in the description denotes a value range in which the values given at a left end and a right end of the "en dash" are respectively used as a minimum value and a maximum value. In the attached drawings, like reference signs are used to denote units having similar or identical structure.

In order to make the objectives, technical solutions, and advantages of the present invention clearer, the present invention is further described in detail below by reference to the embodiments and the accompanying drawings. It should be understood that the embodiments described here are only exemplary ones for illustrating the present invention, and are not intended to limit the present invention.

Figure 2:
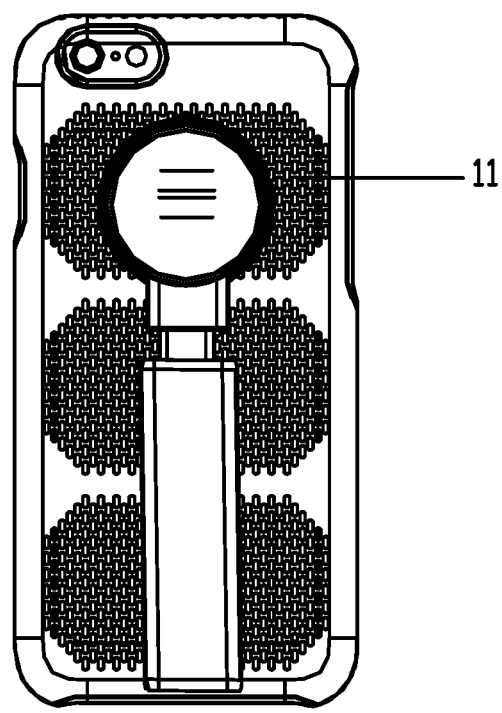
FIG. 2 is a back view of the mobile phone car mount according to the embodiment of the present invention.

Referring to FIG. 1 and FIG. 2, FIG. 1 illustrates a mobile phone car mount according to an embodiment of the present invention. The mobile phone car mount comprises: a mobile phone shell 1, a securing portion 2, a rotating portion 3 and a holding portion 4; wherein a back of the mobile phone shell 1 comprises a metal portion 11; a front end of the securing portion 2 is provided with a magnet 21, the magnet 21 being in magnetic-snap to the metal portion; a rear end of the securing portion 2 is secured to a rotating side 31 of the rotating portion 3; a back 321 of a securing side 32 of the rotating portion is coupled to a rear end 41 of the holding portion 4, a top portion of the securing side 32 is provided with a press switch 325; and the press switch 325 driving the holding portion 4 to open or close.

With the mobile phone car mount according to the present invention, a common mobile phone holding device is replaced by using the mobile phone shell, and the mobile phone holding device is coupled to the securing portion by means of magnetic snap. This is advantageous in that: firstly, the mobile phone shell is capable of effectively protecting the mobile phone, and thus the mobile phone is secure; and in addition, with respect to the mobile phone car mount, since the mobile phone shell (including the mobile phone) is in magnetic-snap to the securing portion, the mobile phone may be conveniently taken out if an incoming call comes. Further, due to the rotating portion, a user is capable of conveniently selecting an angle; and the holding portion is capable of conveniently holds the mobile phone car mount at the air conditioning outlet.

Optionally, the back of the mobile phone shell 1 is provided with a plurality of holes. Such configuration is intended to dissipate heat of the mobile phone. Generally, a smart vehicle-mounted system is equipped with a charging port, and statistical data indicates that over 90% of users need to charge their mobile phones during driving. In this case, the mobile phone generally runs a navigation system or other APPs, and thus the temperature of the mobile phone is high. Therefore, the holes effectively allow the cold air from the air conditioner to blow into the mobile phone, thereby achieving an effect of heat dissipation.

Optionally, the rotating side 31 may be specifically a round ball, wherein the securing side 32 of the round ball is provided with a round ball groove mating with the round ball, and a maximum depth of the round ball groove is greater than the radius of the round ball. Such additional configuration is intended to ease rotation of the rotating portion. With respect to a round shape, rotation is the most convenient. Configuring the maximum depth of the round ball groove to be greater than the radius of the round ball is to prevent the round ball from dropping off from the round ball groove. The mobile phone is capable of rotating by 360 degrees within the round ball groove. Therefore, the user may select any angle, which facilitates user's watching the mobile phone. This solution achieves great convenience when the angle of the mobile phone is downwardly inclined, because in case of downward inclination, due to the effect of gravity, the mobile phone may be easily secured to the downward inclination angle. However, when the mobile phone needs to be upwardly inclined, the mobile phone may not be easily secured. Therefore, the outer surface of the round ball herein is provided with a telescopic plate, wherein the telescopic plate is capable of telescoping radially along the round ball, and the telescopic plate is of a triangular shape. In this way, when the user inclines upwardly, the telescopic plate is capable of stretching out to prevent, from the bottom, the round ball from moving downwardly, and thus the mobile phone is upwardly inclined. The technical solution according to the present invention achieves full-angle securing and selection.

Figure 3:
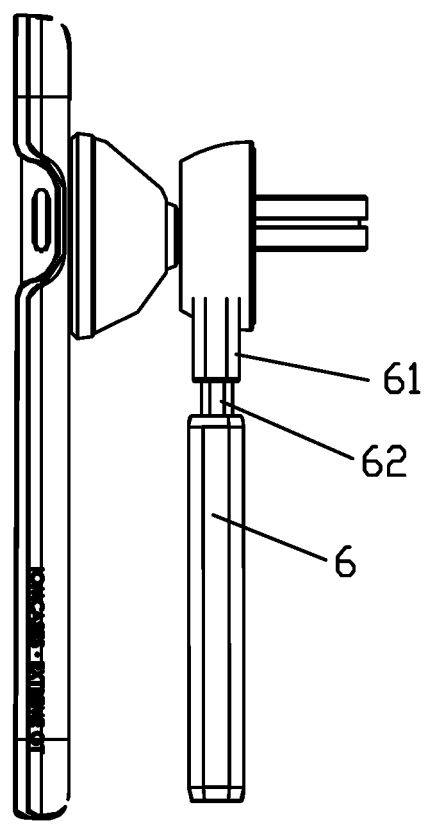
FIG. 3 is a left view of the mobile phone car mount according to the embodiment of the present invention.

Optionally, the mobile phone car mount further comprises a selfie stick 6 (as illustrated in FIG. 3); wherein the selfie stick 6 comprises a telescopic rod 62 and a joint portion 61, the joint portion 61 being provided with a notch mating with the press switch 325.

The selfie stick 6 is configured, and the the selfie stick can be removed by the user freely, such that the user conveniently shifts the the selfie stick between selfie and vehicle-mounted use, which further improves user experience.

The above descriptions are merely preferred embodiments of the present invention, but not intended to limit the present invention. Any modification, equivalent replacement, and improvement made without departing from the spirit and principle of the present invention shall fall within the protection scope of the present invention.

What is claimed is:

1. A mobile phone car mount, comprising: a mobile phone shell, a securing portion, a rotating portion and a holding portion; wherein a back of the mobile phone shell comprises a metal portion; a front end of the securing portion is provided with a magnet, the magnet being in magnetic-snap to the metal portion; a rear end of the securing portion is secured to a rotating side of the rotating portion; a back of a securing side of the rotating portion is coupled to a rear end of the holding portion, and a top portion of the securing side is provided with a press switch which controls opening and closing of the holding portion, wherein the rotating side is a round ball, and the securing side of the rotating portion is provided with a round ball groove mating with the round ball, a maximum depth of the round ball groove being greater than a radius of the round ball and less than a diameter of the round ball.

2. The mobile phone car mount according to claim 1, wherein the back of the mobile phone shell is provided with a plurality of holes.

3. The mobile phone car mount according to claim 1, wherein an outer surface of the round ball is provided with a telescopic plate that is capable of telescoping radially along the round ball, the telescopic plate being of a triangular shape.

4. The mobile phone car mount according to claim 1, further comprising a selfie stick; wherein the selfie stick comprises a telescopic rod and a joint portion, the joint portion being provided with a notch mating with the press switch.

* * * * *